Nov. 3, 1953     A. F. ERICKSON     2,657,825
SEAL
Filed June 24, 1950
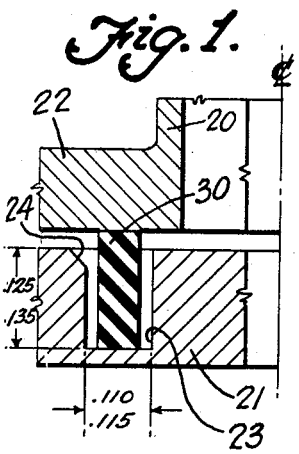
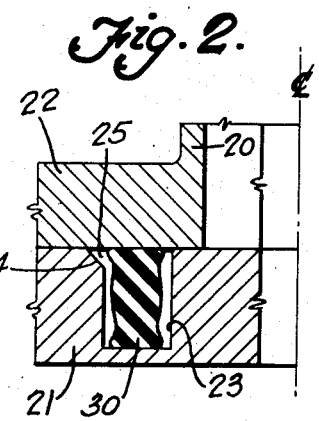
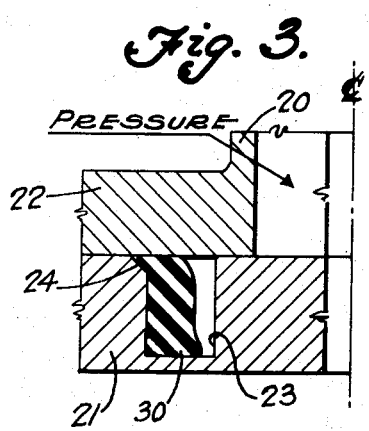
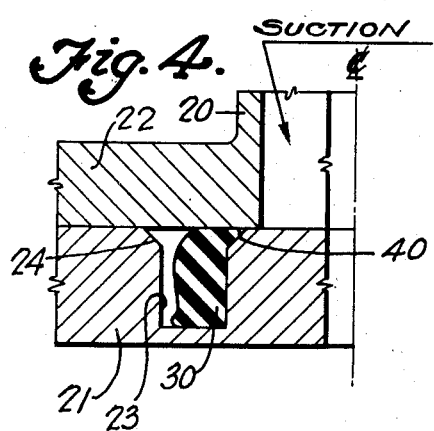
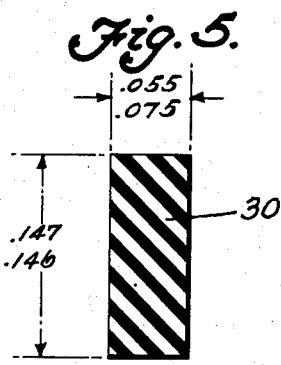
INVENTOR
ANTON F. ERICKSON
BY
HIS ATTORNEYS Patented Nov. 3, 1953

2,657,825

UNITED STATES PATENT OFFICE 2,657,825

SEAL

Anton F. Erickson, Dayton, Ohio, assignor to General Motors Corporation, Detroit, Mich., a corporation of Delaware Application June 24, 1950, Serial No. 170,071

2 Claims. (Cl. 220—46)

This invention relates to an improved seal.

It is among the objects of the present invention to provide a resilient packing clamped between two engaging members, said packing depending upon pressure to move it into a position in which it will substantially seal against leakage between said members.

A further object of the present invention is to increase sealing contact of the resilient packing by providing a wedge shaped space formed by adjacent portions of the two members between which the packing is pressed, so that, when said packing is shifted into sealing position by pressure, portions of the packing will be tightly wedged into said space, sealing the line of contact of said two members and eliminating leakage therebetween.

Further objects and advantages of the present invention will be apparent from the following description, reference being had to the accompanying drawings wherein a preferred embodiment of the present invention is clearly shown.

In the drawings:

Fig. 1 is a fragmentary, sectional view showing the resilient packing placed between two members preparatory to clamping them together.

Fig. 2 is a view similar to Fig. 1, showing the members in engagement, with the packing pressed therebetween and prior to the application of pressure due to initial leakage, which will shift the packing radially into sealing position.

Fig. 3 is a view similar to Fig. 2, the packing however, being shown shifted to one side of the groove in response to pressure having been applied and having leaked initially between the engaging members.

Fig. 4 is a view similar to Fig. 3, the packing however, being shown shifted to the side of the groove opposite that shown in Fig. 3, as a result of pressure leakage from outside the device in response to a subatmospheric pressure condition within the device.

Fig. 5 is a detail sectional view of the packing, made from any suitable resilient material. The dimensions shown in this figure specify a resilient packing most satisfactorily used in a slot the comparative dimensions of which are shown in Fig. 1.

Referring to the drawings, the two members to be clamped together and to be sealed against leakage are designated by the numerals 20 and 21. In the present drawing member 20 is shown as a cylinder having an outwardly extending flange 22. The member 21 is a plate or head for closing the one end of the cylinder 20. In the surface of member 21 to engage the cylinder 20, there is provided an annular groove 23 so arranged and of such a diameter as to be completely covered by the cylinder flange 22 when the head or member 21 is placed and clamped upon the cylinder in any suitable manner. In Fig. 1, the outer, annular peripheral edge of the groove 23, or the one more remote from the interior of the cylinder 20, is chamfered as at 24 presenting a sloping surface which cooperates with the adjacent surface of the flange 22, when the head and cylinder are clamped together, to provide a wedge-shaped annular space or recess 25 around the closed groove as shown in Fig. 2. In the particular structure illustrated by the enlarged drawings Figs. 1, 2 and 3, the groove 23 is approximately one-eighth of an inch deep and eleven hundredths of an inch wide, the sloping surface 24 formed by the slight chamfer of the outer peripheral edge of the groove being at substantially 45 degrees to the outer surface of plate 21.

The sealing element 30 placed in the groove 23 is a ring of any suitable, resilient material shown in Fig. 5 to be rectangular in cross-sectional shape, approximately five hundredths of an inch thick and fifteen hundredths of an inch long for the particular groove shown in these figures. These comparative sizes in the groove and its contained sealing ring have been proven successful in extended life tests and experiments.

Fig. 1 shows the top end surface of the sealing ring 30 engaged by the cylinder flange 22 before the head 21 is pressed against the cylinder. When, as shown in Fig. 2, the head 21 is clamped upon the cylinder so that the two adjacent surfaces of these two members engage, the sealing ring 30 is compressed and distorted, but even in its compressed state, said ring will not completely fill groove 23 so as to engage both annular surfaces thereof but on the contrary, will be spaced from each wherever the compressed ring assumes a position centrally of the groove as shown in Fig. 2. Compression by the head and cylinder will not cause the sealing ring completely to fill the wedge-shaped space 25 even though portions of the ring may partially enter the space as a result of this ring compression, there will be no positive seal at this point under these conditions.

When, for instance, fluid pressure is built up in cylinder 20 there will be a slight and temporary initial leakage of fluid between the contacting surfaces of the head 21 and cylinder flange 22 the fluid pressure, building up in the space between the packing ring 30 and the smaller diameter annular surface of groove 23 and exerted against the movable ring 30 will stretch and move the ring radially toward the outer annular surface of the groove. With this pressure against the inner wall of the pliable ring 30 it is shifted outwardly, its outer peripheral surface being pressed against and assuming the contour of said outer surface of the groove 23. The upper, outer portion of the ring will be forced into the wedge-shaped space 25 as shown in Fig. 3 causing it substantially to fill said space and thereby seal this line of contact between the head 21 and cylinder flange 22.

When, under certain circumstances subatmospheric pressures are created in the cylinder 20, and leakage into the cylinder is to be prevented, a chamfer 40, similar to chamfer 24 is provided in the inner annular edge of the groove 23. Initially atmosphere will leak between the contacting surfaces of the head 21 and flange 22 upon the creation of subatmospheric pressures within the cylinder. This air leak will, like the fluid leak from the cylinder, build up a pressure within the groove space about the outer wall of the bearing ring, moving the ring, radially inwardly to engage the inner groove wall and sealingly fill the wedge-shaped space formed by the chamfer 40. Thus in both instances, after a short initial leak, the sealing ring is stressed radially to fill a wedge-shaped space and seal completely the contact line of the two members, the head 21 and flange 22 at this juncture.

Where both peripheral edges of the groove 23 are chamfered as shown in Fig. 4, to seal against leakage from and into the cylinder during its operation, the reversal of pressure acts against the ring portion occupying the wedge-shaped space, to shift the sealing ring across the groove and into occupying position of the opposite wedge-shaped space, the lower end following this movement across the groove so that the entire wall of the sealing ring is pressed against the entire wall of the groove. This shifting of the packing transversely of the groove occurs in response to each reversal of the pressure.

While the embodiment of the present invention as herein disclosed, constitutes a preferred form, it is to be understood that other forms might be adopted.

What is claimed is as follows:

1. A seal structure for sealing a joint between two members around an opening provided in at least one of the members, including in the combination, a pair of engaging members at least one of which has an opening in the same and engaged adjacent the periphery of the opening by the other member establishing thereby a joint line between the said members, one of said members having a channel therein adjacent the periphery of the opening with one end of the channel terminating at the line of the joint, at least one edge of said channel being chamfered upwardly relative to the channel and angularly relative to the line of the joint with the outermost extremity of the said edge terminating at the line of the joint and forming therewith the apex of a wedge shaped chamber around one edge of the said channel, the other of said members having a relatively flat surface extending across the said channel and said wedge shaped chamber and engaging said one member at the line of the joint at the edges of the said channel and the said chamber to close the same at the line of the joint, and a resilient elastically deformable seal member in said channel having in transverse cross section a width dimension substantially less than the width dimension of said channel and a depth dimension substantially greater than the depth dimension of said channel with a total volume less than the volume of said channel and said chamber when confined in said channel between said members, said seal member being movable bodily transversely of said channel in a direction opposite to the direction of entry of pressure into the channel for engagement with a side wall of the channel and deformable into said wedge shaped chamber to seal the joint line at the apex of the said chamber.

2. A seal structure for sealing a joint between two members around an opening provided in at least one of the members, including in the combination, a pair of engaging members at least one of which has an opening in the same and engaged adjacent the periphery of the opening by the other member establishing thereby a joint line between the said members, one of said members having a channel therein adjacent the periphery of the opening shaped in transverse cross section in the form of a quadrilateral with one end of the channel terminating at the line of the joint, at least one edge of said channel being chamfered upwardly relative to the channel and angularly relative to the line of the joint with the outermost extremity of the said edge terminating at the line of the joint and forming therewith the apex of a wedge shaped chamber around one edge of the said channel, the other of said members having a flat surface extending across the said channel and said wedge shaped chamber and engaging said one member at the line of the joint at the edges of the said channel and the said chamber to close the same at the line of the joint, and a resilient elastically deformable seal member in said channel having in transverse cross section a width dimension substantially less than the width dimension of said channel and a depth dimension substantially greater than the depth dimension of said channel with a total volume less than the volume of said channel and said chamber when confined in said channel between said members shaped in transverse cross section in the form of a quadrilateral and including a flat face engaging the flat surface on the said other member, said seal member being movable bodily transversely of said channel in a direction opposite to the direction of entry of pressure into the channel for engagement with a side wall of the channel and deformable into said wedge shaped chamber to seal the joint line at the apex of the said chamber.

ANTON F. ERICKSON.

References Cited in the file of this patent

UNITED STATES PATENTS

| Number | Name | Date |
|---|---|---|
| 1,661,325 | Derrick | Mar. 6, 1928 |
| 2,352,192 | Gasche | June 27, 1944 |
| 2,389,824 | Smith | Nov. 27, 1945 |
| 2,404,410 | Smith | July 23, 1946 |
| 2,427,787 | Hunter | Sept. 23, 1947 |
| 2,459,668 | Melichar | Jan. 18, 1949 |

FOREIGN PATENTS

| Number | Country | Date |
|---|---|---|
| 303,408 | Great Britain | Dec. 28, 1928 |
| 570,792 | Germany | Feb. 20, 1933 |